United States Patent
Oh et al.

(10) Patent No.: US 8,373,390 B2
(45) Date of Patent: Feb. 12, 2013

(54) SAFETY DEVICE FOR CUTTING-OFF HIGH VOLTAGE FOR HYBRID ELECTRIC VEHICLE

(75) Inventors: Jung Sub Oh, Gyeonggi-do (KR); Jin Soo Ryu, Gyeonggi-do (KR)

(73) Assignees: Hyundai Motor Company, Seoul (KR); Kia Motors Corportion, Seoul (KR); Yura Corporation Co., Ltd., Chungcheongbuk-do (KR)

( * ) Notice: Subject to any disclaimer, the term of this patent is extended or adjusted under 35 U.S.C. 154(b) by 346 days.

(21) Appl. No.: 12/777,579

(22) Filed: May 11, 2010

(65) Prior Publication Data

US 2011/0127154 A1    Jun. 2, 2011

(30) Foreign Application Priority Data

Dec. 1, 2009   (KR) ................. 10-2009-0117583

(51) Int. Cl.
*H02J 7/00*   (2006.01)
(52) U.S. Cl. .................................................. 320/109
(58) Field of Classification Search .............. 320/109
See application file for complete search history.

(56) References Cited

U.S. PATENT DOCUMENTS

| | | | | |
|---|---|---|---|---|
| 3,761,660 A * | 9/1973 | Jones | ............. | 218/150 |
| 3,911,238 A * | 10/1975 | Otto et al. | ............. | 200/83 S |
| 5,219,070 A * | 6/1993 | Grunert et al. | ............. | 200/330 |
| 5,229,703 A | 7/1993 | Harris | | |
| 5,864,106 A * | 1/1999 | Hartwig et al. | ............. | 200/17 R |
| 6,342,769 B1 * | 1/2002 | Birkestrand et al. | ............. | 318/139 |
| 6,348,751 B1 * | 2/2002 | Jermakian et al. | ............. | 310/207 |
| 6,843,672 B2 * | 1/2005 | Kato et al. | ............. | 439/164 |
| 6,873,514 B2 * | 3/2005 | Maller et al. | ............. | 361/160 |
| 7,283,344 B2 * | 10/2007 | Mukai et al. | ............. | 361/93.1 |
| 7,433,170 B2 * | 10/2008 | Lluch et al. | ............. | 361/139 |
| 7,522,025 B2 * | 4/2009 | Zeitlberger et al. | ............. | 335/199 |
| 7,639,460 B2 * | 12/2009 | Couture et al. | ............. | 361/2 |
| 7,929,260 B2 * | 4/2011 | Roscoe et al. | ............. | 361/2 |
| 8,192,212 B2 * | 6/2012 | Casses et al. | ............. | 439/181 |
| 2002/0130643 A1 * | 9/2002 | Binder et al. | ............. | 323/267 |
| 2003/0137786 A1 * | 7/2003 | Hasegawa et al. | ............. | 361/10 |
| 2003/0231439 A1 * | 12/2003 | Juds et al. | ............. | 361/2 |
| 2007/0235313 A1 | 10/2007 | Maguire et al. | | |

FOREIGN PATENT DOCUMENTS

| | | |
|---|---|---|
| JP | 11-180232 A | 7/1999 |
| KR | 10-1997-0038542 | 7/1990 |
| KR | 10-2007-0094153 | 9/2007 |

\* cited by examiner

*Primary Examiner* — Arun Williams
(74) *Attorney, Agent, or Firm* — Edwards Wildman Palmer LLP; Peter F. Corless (57) ABSTRACT

The present invention provides a safety device for cutting off high voltage for a hybrid electric vehicle, which cuts off the connection between an interlock pin and a battery management system to cut off the current flow after electric power is supplied from a high voltage battery, thus preventing the occurrence of arc when an external connected is disconnected.

For this purpose, the present invention provides a safety device for cutting off high voltage for a hybrid electric vehicle, the safety device including: a male housing including a guide hole formed on the bottom thereof; a female housing into which the male housing is inserted; a cover including a projection formed on the bottom thereof to rotate along the guide hole; a locker connected to the projection and rotating along the guide hole; and an interlock housing including an interlock pin attached to the bottom thereof and moving up and down in the rotational direction of the locker to control the current flow between the interlock pin and a battery management system, thus preventing the occurrence of arc when an external connector is disconnected.

9 Claims, 9 Drawing Sheets

FIG.9 a) UNLOCKING   b)   c) LOCKING

FIG.10

SAFETY DEVICE FOR CUTTING-OFF HIGH VOLTAGE FOR HYBRID ELECTRIC VEHICLE

CROSS-REFERENCE TO RELATED APPLICATION

This application claims under 35 U.S.C. §119(a) the benefit of Korean Patent Application No. 10-2009-0117583 filed Dec. 1, 2009, the entire contents of which are incorporated herein by reference.

BACKGROUND (a) Technical Field

The present disclosure relates, generally, to a safety device for cutting off high voltage. More particularly, it relates to a safety device for cutting off high voltage for a hybrid electric vehicle, which can prevent the occurrence of arc during disconnection of a connector.

(b) Background Art

In general, a vehicle generates electricity and the electricity is stored in a battery to drive electronic devices such as a lamp, a radio, etc.

In particular, an electric vehicle, a fuel cell vehicle, and a hybrid vehicle driven by at least two power sources employ a high voltage battery and a motor which use a higher voltage than the operating voltage of existing vehicles.

Here, a spark or an arc with a continuous spark occurs at a voltage of more than 9 V in a metal material.

Such an arc often occurs when a mechanical contact is released, that is, when a connector is disconnected while electric power is applied to the connector.

Accordingly, the arc formed when the connector is disconnected may cause a fire or damage to other elements.

Conventionally, since a high voltage is applied to another connector during disconnection of the connector, an electric shock accident may occur.

Accordingly, there remains a need in the art for safety devices for cutting off high voltage for a hybrid electric vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a safety device for cutting off high voltage for a hybrid electric vehicle, wherein a dual connection between connectors and an interlock function are suitably implemented by one rotation of a locker to prevent the occurrence of an arc during disconnection of the connector, thus improving safety and workability.

In one preferred embodiment, the present invention preferably provides a safety device for cutting off high voltage for a hybrid electric vehicle, the safety device preferably including a male housing including a guide hole formed on the bottom thereof; a female housing into which the male housing is suitably inserted; a cover including a projection formed on the bottom thereof to rotate along the guide hole; a locker that is suitably connected to the projection and rotating along the guide hole; and an interlock housing including an interlock pin that is suitably attached to the bottom thereof and moving up and down in the rotational direction of the locker to suitably control the current flow between the interlock pin and a battery management system, thus preventing the occurrence of arc when an external connector is suitably disconnected.

In a preferred embodiment, the cover may preferably include a first spring inserted into the projection and a bushing movably supported in the vertical direction by the first spring and fixing the locker.

In another preferred embodiment, the male housing may preferably include a guide projection formed along the guide hole on the bottom thereof to suitably guide the rotational movement of the bushing inserted into the projection, an unlocking groove formed on one end of the guide hole such that the bushing is suitably inserted and fixed thereto, and a locking groove suitably formed on the other end of the guide hole such that the bushing is inserted and fixed thereto.

In still another preferred embodiment of the present invention, the female housing may preferably include a projection formed on the bottom thereof, a second spring mounted in the inside of the projection, an interlock housing suitably supported by the second spring and moving up and down by a pressing portion formed on the locker to be extracted from and inserted into the projection, and an interlock pin that is suitably inserted and protruding through a through-hole of the projection by the interlock housing and electrically connected to and disconnected from the battery management system.

In yet another preferred embodiment, the locker may include a pressing portion having a wedge-shaped cross section to press the interlock housing during rotation.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 10: | cover |
| 11: | grip portion |
| 12: | projection |
| 13: | first spring |
| 14: | bushing |
| 20: | fuse |
| 21: | connection terminal |
| 22: | terminal |
| 30: | male housing |
| 31: | terminal insertion |
| 32: | shipping hole |
| 33: | guide hole |
| 34: | guide projection |
| 35a: | unlocking groove |
| 35b: | locking groove |
| 36: | misassembly prevention key groove |
| 40: | locker |
| 41: | pressing portion |
| 50: | female housing |
| 51: | projection |
| 52: | misassembly prevention key |
| 53: | seal |
| 54: | interlock housing |
| 55: | interlock pin |
| 56: | second spring |
| 60: | external connector |
| 70: | battery management system (BMS) |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In a first aspect, the present invention features a safety device for cutting off high voltage for a hybrid electric vehicle, the safety device comprising a male housing comprising a guide hole, a female housing into which the male housing is inserted, a cover comprising a projection, a locker connected to the projection, and an interlock housing.

In one embodiment, the male housing includes a guide hole formed on the bottom thereof.

In another embodiment, the cover comprising a projection is formed on the bottom thereof to rotate along the guide hole.

In another further embodiment, the locker is connected to the projection and rotating along the guide hole.

In still another further embodiment, the interlock housing includes an interlock pin attached to the bottom thereof and moves up and down in the rotational direction of the locker to control the current flow between the interlock pin and a battery management system, thus preventing the occurrence of arc when an external connector is disconnected.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
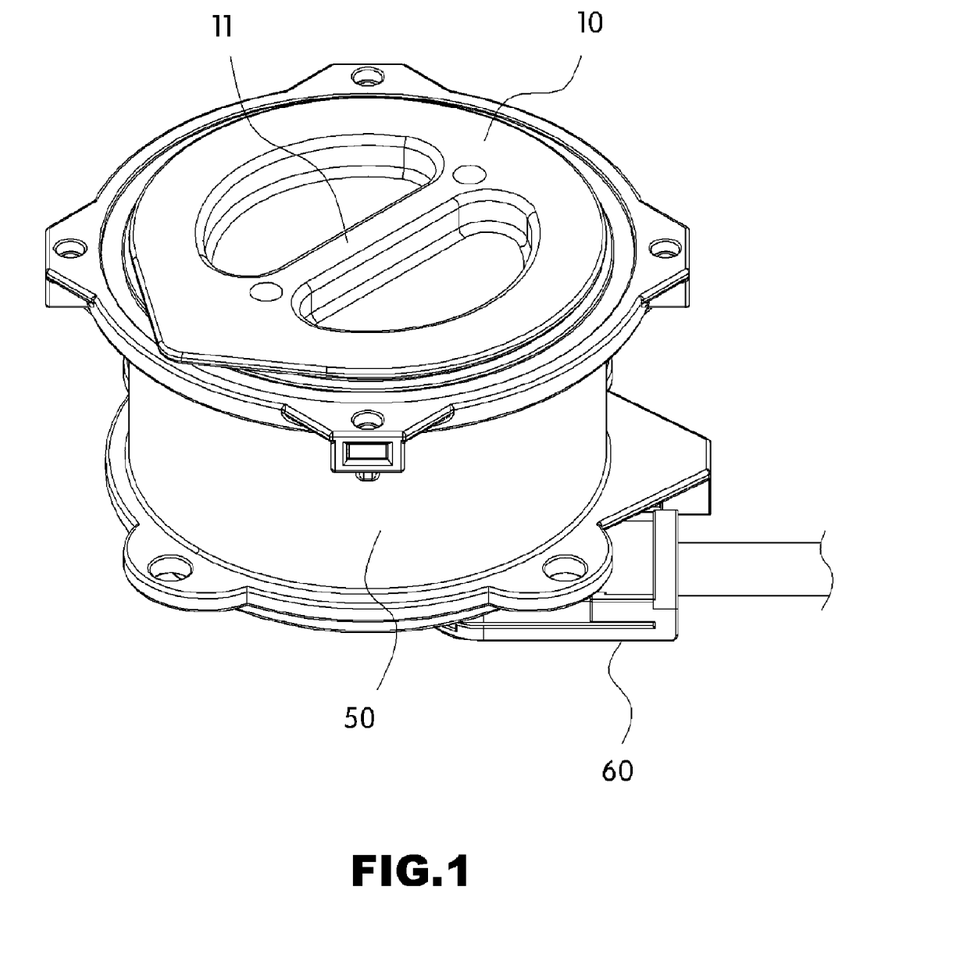
FIG. 1 is a perspective view of a safety device for cutting off high voltage for a hybrid electric vehicle in accordance with an exemplary embodiment of the present invention.
Figure 2:
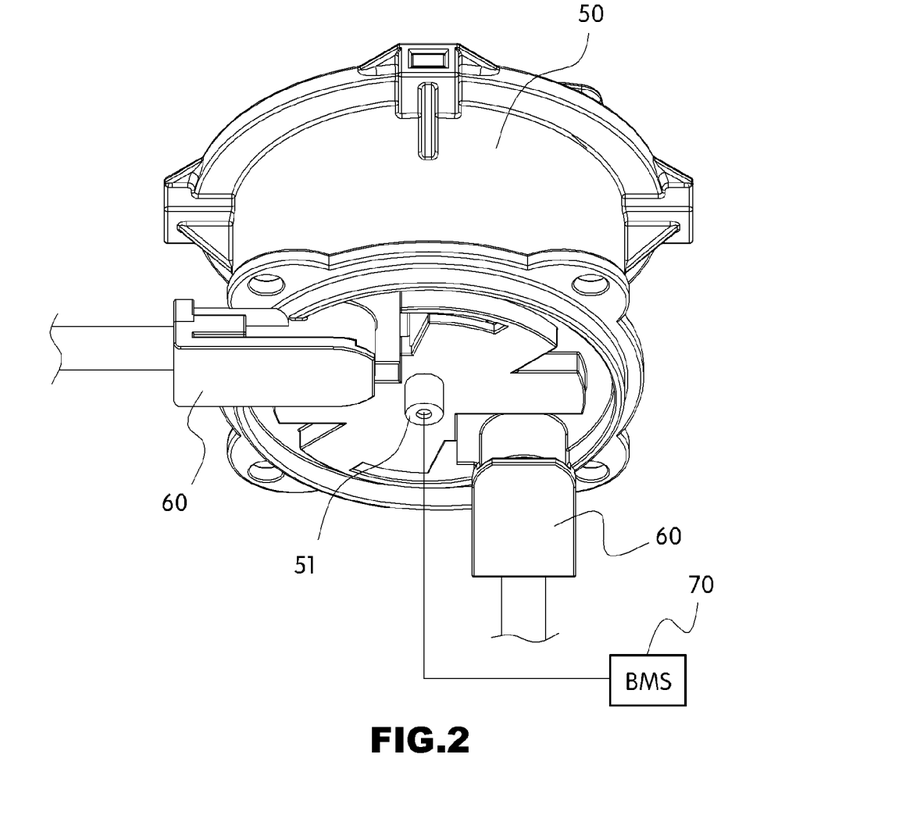
FIG. 2 is a bottom perspective view of FIG. 1.
Figure 3:
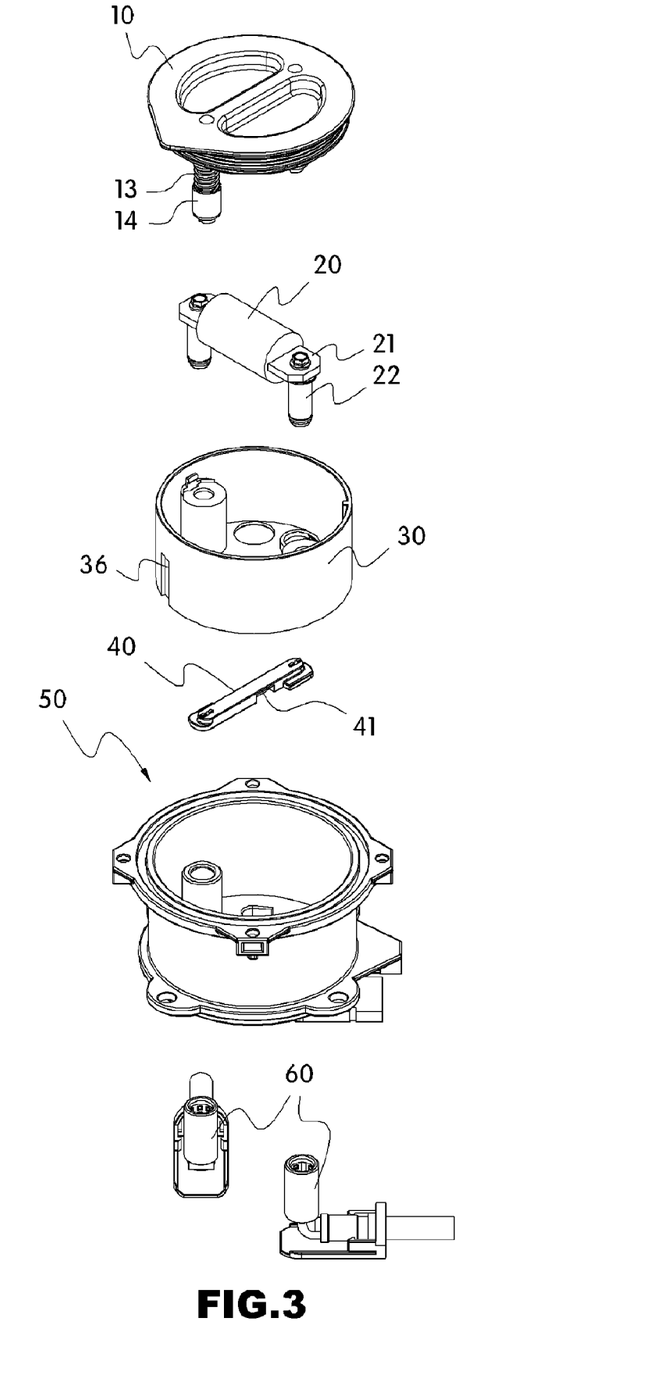
FIG. 3 is an exploded perspective view of FIG. 1.
Figure 4:
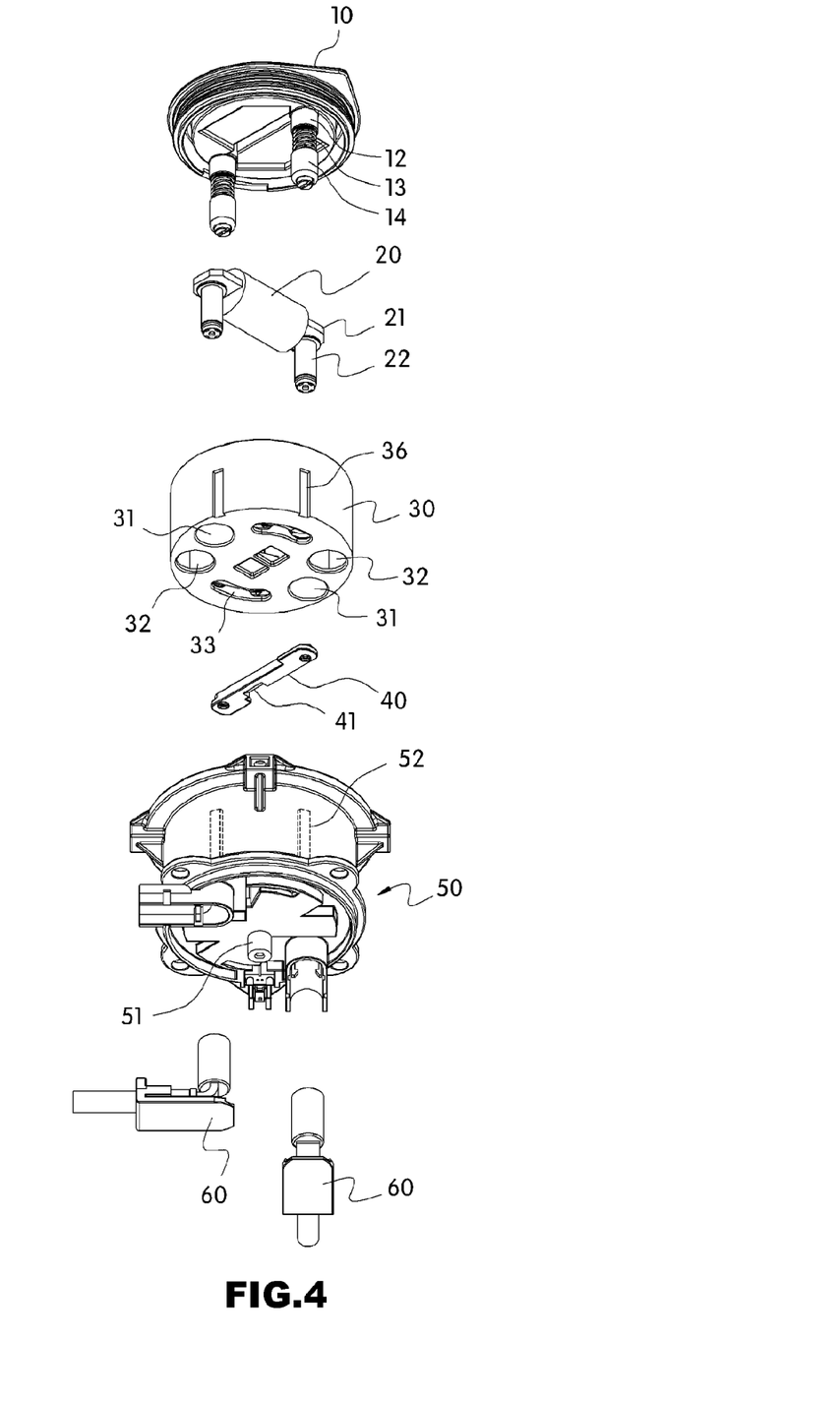
FIG. 4 is an exploded perspective view of FIG. 2.
Figure 5:
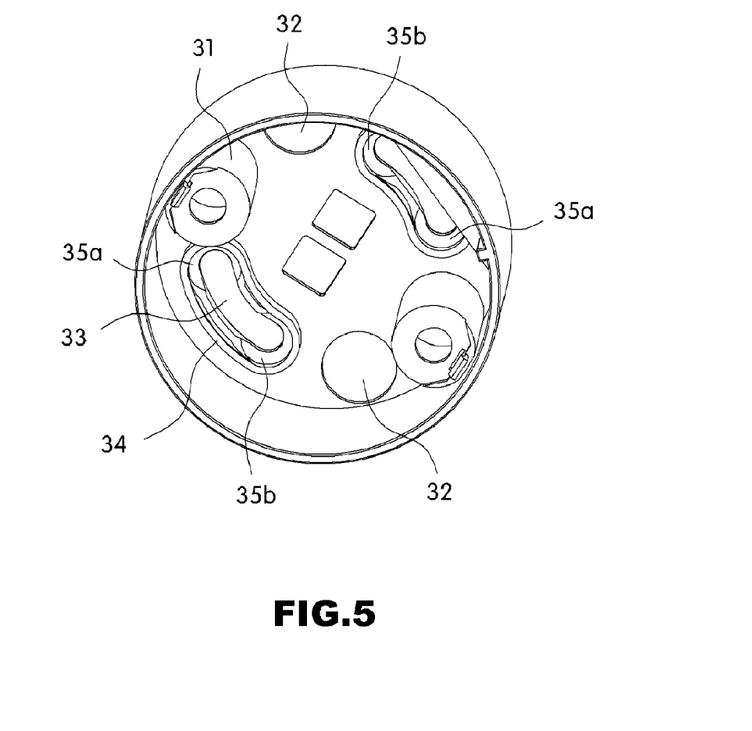
FIG. 5 is a perspective view showing the interior of a male housing in FIG. 3.

According to a preferred embodiment and as shown in FIG. 1, FIG. 1 is a perspective view of a safety device for cutting off high voltage for a hybrid electric vehicle. According to another preferred embodiment and as shown in FIG. 2, FIG. 2 is a bottom perspective view of FIG. 1. According to another preferred embodiment and as shown in FIG. 3, FIG. 3 is an exploded perspective view of FIG. 1. According to another preferred embodiment and as shown in FIG. 4, FIG. 4 is an exploded perspective view of FIG. 2. According to another preferred embodiment and as shown in FIG. 5, FIG. 5 is a perspective view showing the interior of a male housing in FIG. 3.

Preferably, a safety device of the present invention includes a male housing 30, a locker 40, an interlock pin 55, an interlock housing 54, a female housing 50, a bushing 14, a first spring 13, a fuse 20, a seal 53, and a cover 10.

According to certain preferred embodiments, the cover 10 protects the contents contained in the male housing 30 and includes handle grooves provided on the top surface thereof and a grip portion 11 provided between the handle grooves such that the cover 10 can be rotated by a user's hand.

Preferably, a pair of projections 12 are suitably formed on the bottom surface of the cover 10, and an end of each projection 12 is suitably connected to the locker 40 such that the locker 40 is suitably rotated by the projection 12 when the cover 10 is suitably rotated by the user through the grip portion 11.

In other further preferred embodiments, the seal 53 is fitted on the circumference of the cover 10 to keep the air-tightness between the male housing 30 and the cover 10.

Preferably, the first spring 13 and the bushing 14 are placed on the projection 12 such that the bushing 14 is movably supported in the vertical direction along the projection 12 by the first spring 13.

According to further preferred embodiments, the projection 12 serves to suitably support and rotate the bushing 14 and the first spring 13.

Preferably, the female housing 50 is suitably arranged on the outermost side of the safety device and accommodates the male housing 30 therein, and the upper end of the female housing 50 is opened and closed by the cover 10.

According to further preferred embodiments of the present invention, the fuse mounting projection protrudes upward from the inner bottom surface of the male housing 30 such that the fuse 20 is supported by the fuse mounting projection.

Preferably, a connection terminal 21 is suitably attached to both ends of the fuse 20, and a terminal 22 is connected to each connection terminal 21.

Preferably, a guide groove 33 is suitably formed on the bottom surface of the male housing 30 such that the projection 12 rotates along the guide groove 33.

Preferably, a guide projection 34 is suitably provided along the guide groove 33 on the bottom surface of the male housing 30 to guide the rotational movement of the bushing 14. In further preferred embodiments, an unlocking groove 35a and a locking groove 35b are suitably provided on both ends of the guide projection 34, respectively, such that the bushing 14 is suitably inserted into the unlocking groove 35*a* and the locking groove 35*b* by the elastic force of the first spring 13 to limit the position of the locker 40.

According to further embodiments of the present invention, a terminal insertion 31 protrudes upward from the bottom surface of the male housing 30, and a through-hole is suitably formed in the upper end of the terminal insertion 31. Further, the terminal 22 connected to an external connector 60 is inserted into the terminal insertion 31 and electrically connected to the connection terminal 21 of the fuse 20 through the through-hole.

Preferably, the terminal 22 may have a circular shape.

Further, in certain embodiments, a shipping hole 32 is suitably formed on the bottom surface of the male housing 30 such that the terminal 22 is suitably inserted into the shipping hole 32.

Preferably, the shipping hole 32 is used to suitably accommodate the terminal 22 during shipping so that no current flows to the terminal 22 accommodated in the shipping hole 32 having no terminal.

In other further preferred embodiments, the locker 40 moves the interlock housing 54 up and down to suitably control the contact of the interlock pin 55, and both ends of the locker 40 are suitably connected to the projections 12 of the cover 10 by bolts such that the locker 40 rotates along the guide hole 33 together with the projections 12 while the cover 10 rotates.

Preferably, since the locker 40 moves along the guide hole 33 having a circular shape, it can be rotated at a predetermined angle, and a pressing portion 41 is preferably provided adjacent to the center of the locker 40 to push up the interlock housing 54.

According to other further embodiments, a projection 51 is formed on the bottom surface of the female housing 50, and a second spring 56 is inserted into the inside of the projection 51 such that the interlock housing 54 is elastically supported by the second spring 56 to move up and down.

Preferably, the interlock pin 55 is suitably attached to the bottom surface of the interlock housing 54 to perform an interlock function.

In further related embodiments, the interlock pin 55 is electrically connected to and disconnected from a wire harness of a battery management system (BMS) 70 by the up and down movement of the interlock housing 54. Preferably, the interlock pin 55 is first connected to the BMS 70 before electric power of a high voltage battery is applied so as to allow the current to flow in advance and is disconnected from the BMS 70 before the connector is disconnected while the electric power of the high voltage battery is applied so as to cut off the current flow in advance, thus suitably preventing the occurrence of arc during the disconnection of the connector.

Preferably, a connector insertion is formed upward from the bottom surface of the female housing 50 such that the external connector 60 is suitably inserted into the connector insertion and electrically connected to the terminal 22 coupled to the fuse 20.

In further preferred embodiments, a misassembly prevention key 52 is suitably formed on the inner circumference of the female housing 50 and a misassembly prevention key groove 36 is suitably formed on the outer circumference of the male housing 30 such that the misassembly prevention key 52 is suitably inserted into the misassembly prevention key groove 36, thus preventing the male housing 30 from being misassembled with the female housing 50.

The operation of the safety device for cutting off high voltage in accordance with an exemplary embodiment of the present invention with the above-described configuration is described with reference to FIGS. 6 to 10.

Figure 6:
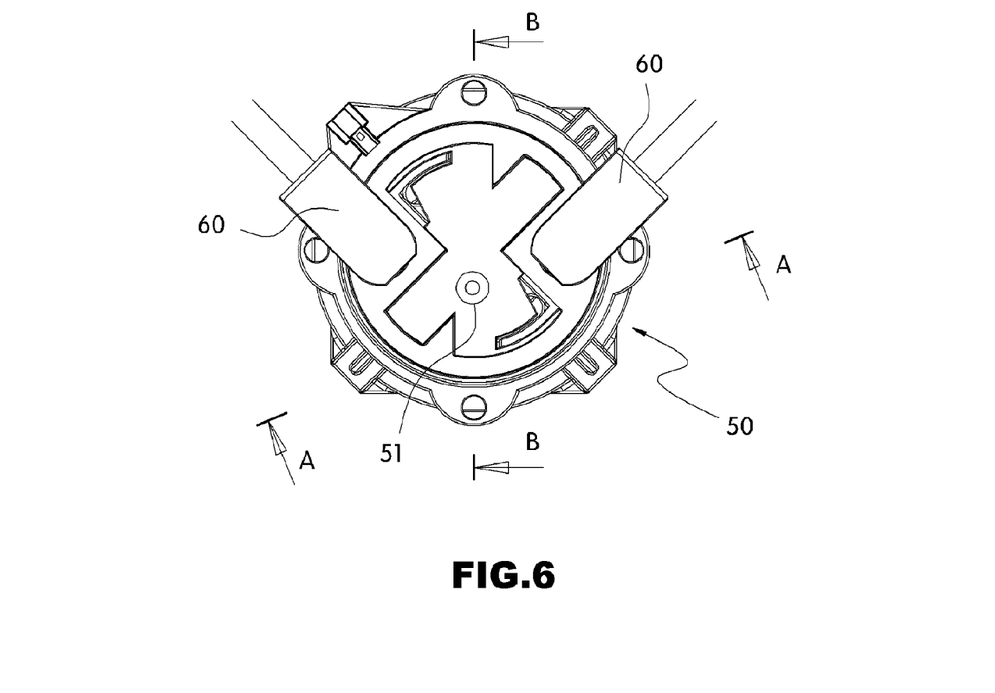
FIG. 6 is a bottom view of FIG. 1.
Figure 7:
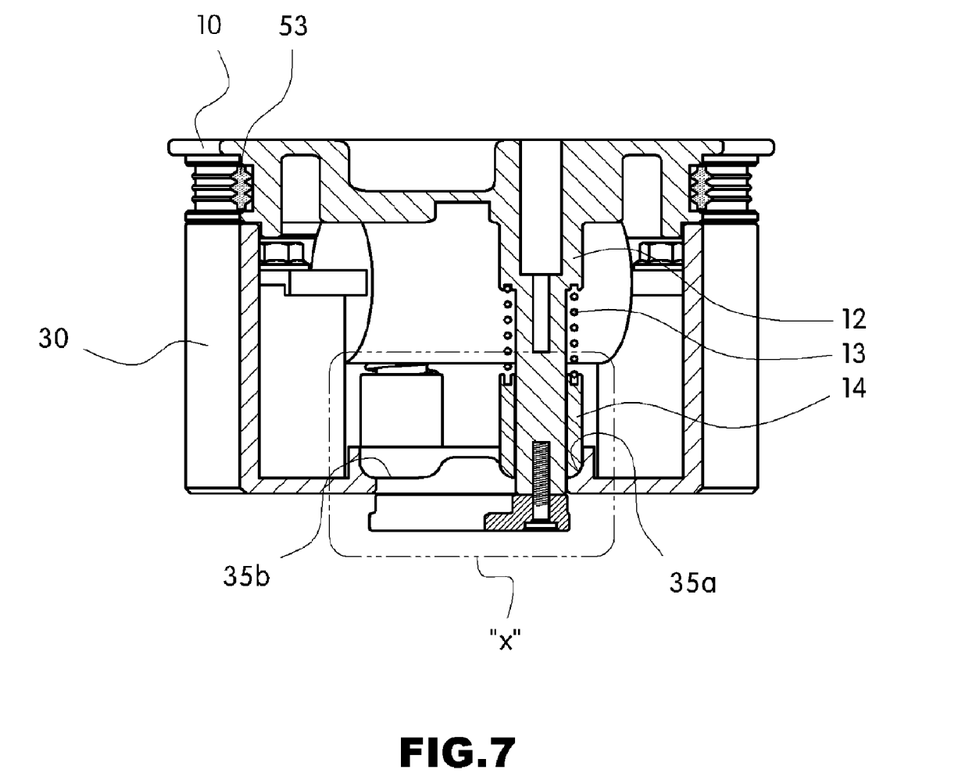
FIG. 7 is a cross-sectional view taken along line A-A of FIG. 6.
Figure 8:
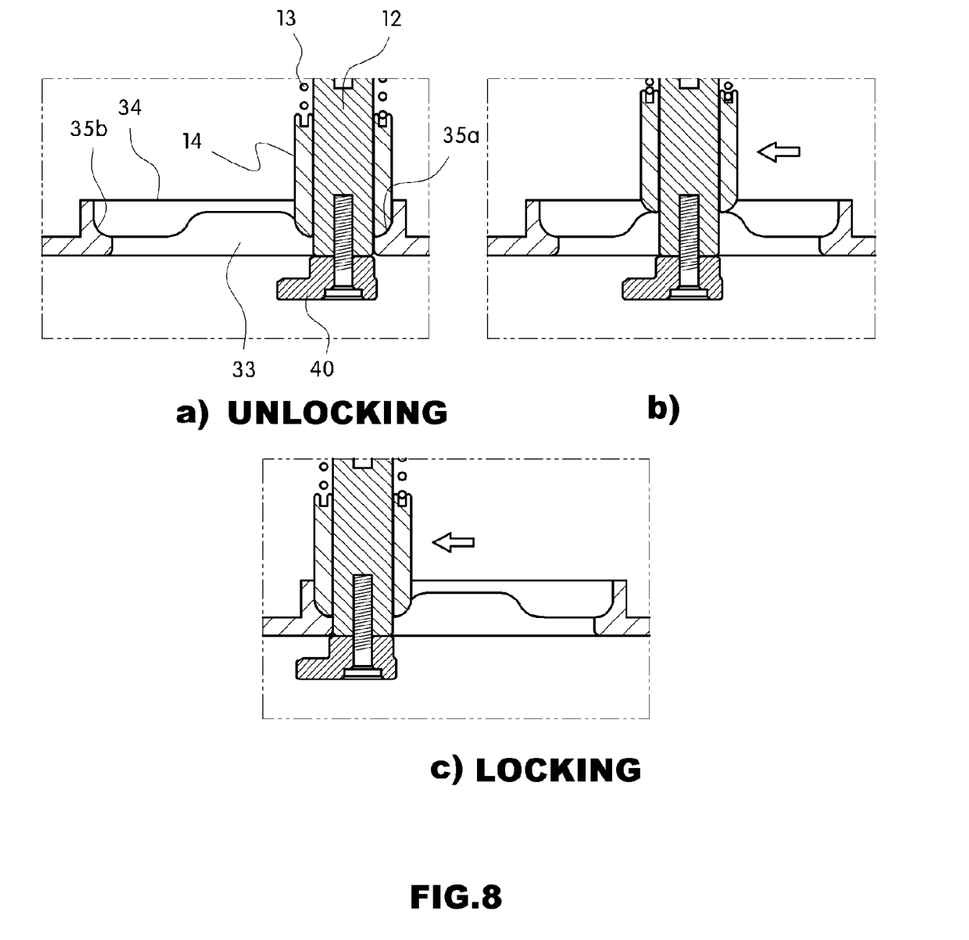
FIG. 8 is a view showing the operation of an X-portion in FIG. 7.
Figure 9:
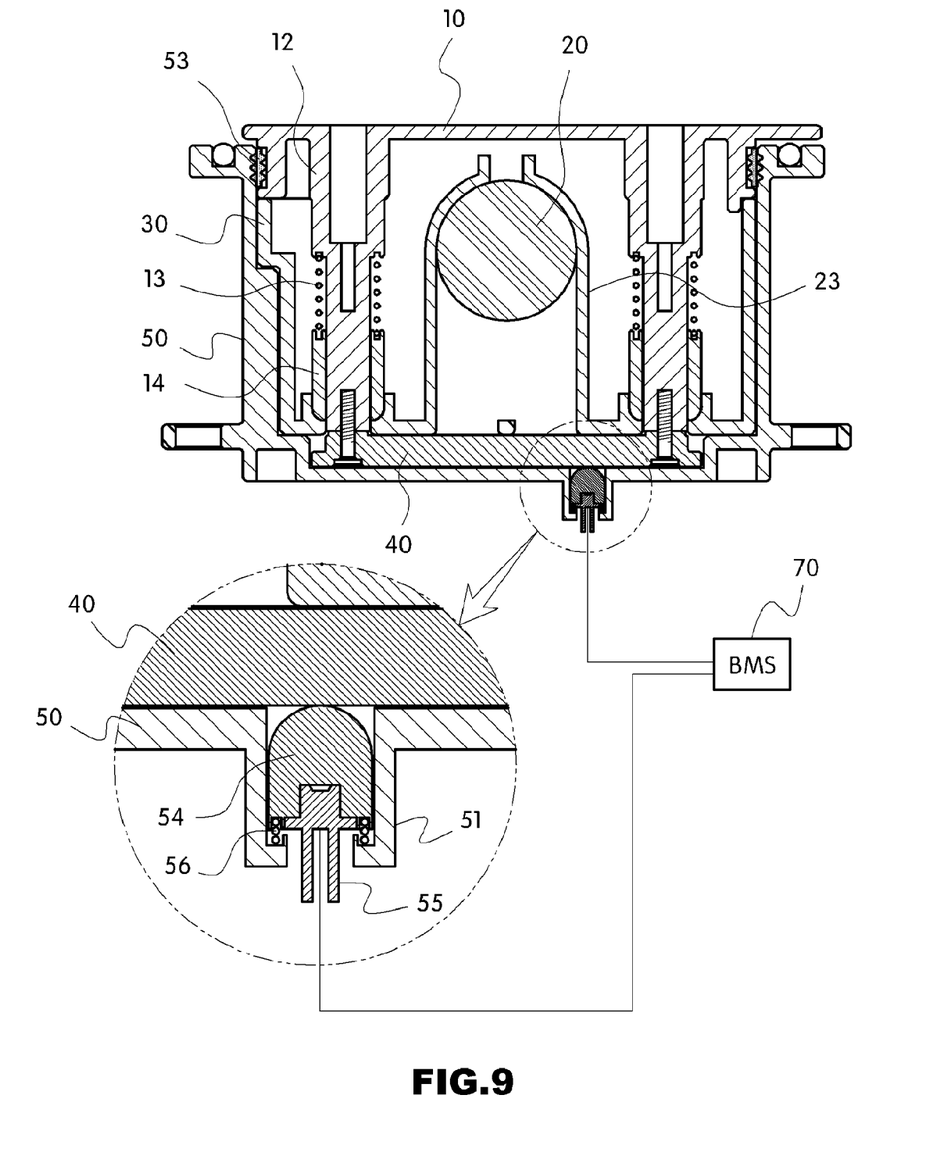
FIG. 9 is a cross-sectional view taken along line B-B of FIG. 6.
Figure 10:
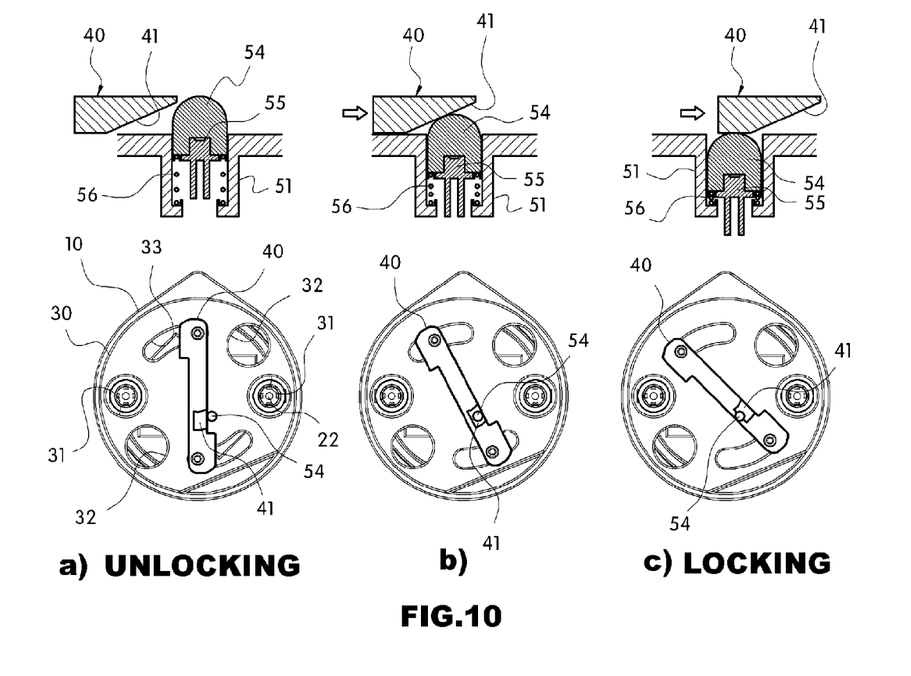
FIG. 10 is a view showing the operation of a locker and an interlock housing in FIG. 6.

According to certain exemplary embodiments, for example as shown in FIGS. 6-10, FIG. 6 is a bottom view of FIG. 1, FIG. 7 is a cross-sectional view taken along line A-A of FIG. 6, FIG. 8 is a view showing the operation of an X-portion in FIG. 7, FIG. 9 is a cross-sectional view taken along line B-B of FIG. 6, and FIG. 10 is a view showing the operation of a locker and an interlock housing in FIG. 6.

In a preferred exemplary embodiment, first, the grip portion 11 formed on the top surface of the cover 10 is held by a user's hand and rotated counterclockwise to be suitably locked.

Preferably, when the grip portion 11 of the cover 10 is suitably locked, the projection 12 formed on the bottom of the cover 10 rotates along the guide hole 33, and the bushing 14 supported by the projection 12 rotates together.

Here, in a further preferred embodiment, the bushing 14 inserted into the unlocking groove 35*a* is suitably extracted from the unlocking groove 35*a* and moves upward. In another further embodiment, the bushing 14 rotates along the guide projection 34 while the first spring 13 elastically supporting the bushing 14 is suitably compressed.

Further, continuously, when the projection 12 is suitably inserted into the locking groove 35*b*, the bushing 14 is suitably inserted into the locking groove 35*b* by the elastic force of the first spring 13 and locked thereto.

In further preferred embodiments, when the grip portion 11 of the cover 10 is switched into a suitably locked state, the interlock housing 54 protruding from the bottom surface of the female housing 50 is suitably inserted into the inside of the projections 51, and thereby the interlock pin 55 protrudes outward from the projection 51.

According to further preferred embodiments, in more detail, when the grip portion 11 of the cover 10 rotates to be suitably locked, the projection 12 rotates, and thereby the locker 40 connected to the projection 12 rotates. Then, the pressing portion 41 of the locker 40 rotates to press the hemispheric interlock housing 54, and thereby the interlock housing 54 is inserted into the inside of the projection 51.

Accordingly, the second spring 56 supporting the interlock housing 54 is suitably compressed, and the interlock pin 55 attached to the bottom surface of the interlock housing 54 protrudes outward from the projection 51 and is electrically connected to the harness of the BMS 70 to allow the current flow.

In other further embodiments, when the grip portion 11 of the cover 10 is rotated clockwise, the projection 12 rotates, and the bushing 14 is suitably extracted from the locking groove 25*b* and moves upward to compress the first spring 13.

Preferably, continuously, the bushing 14 is suitably rotated along the guide projection 34 by the projection 12 and inserted in the unlocking groove 35*a* by the elastic force of the first spring 13 and locked thereto.

According to other preferred embodiments of the present invention, when the projection 12 suitably rotates to be unlocked, the locker 40 connected to the projection 12 rotates, and the interlock housing 54 pressed by the pressing portion 41 of the locker 40 is suitably unlocked to protrude upward from the projection 51 by the elastic force of the second spring 56. Preferably, the interlock pin 55 attached to the interlock housing 54 is suitably inserted into the inside of the projection 51 and electrically disconnected from the harness of the BMS 70 to cut off the current flow, thus preventing the occurrence of arc when the external connector 60 is disconnected from the female housing 50.

Preferably, when the locker 40 is in the unlocked state, the interlock pin 55 is electrically disconnected from the BMS 70 to cut off the current flow to the BMS 70. Further, when the locker 40 is in the locked state, the interlock pin 55 is electrically connected to the BMS 70 to allow the current to flow through the BMS 70.

According to the operation of the safety device for cutting off high voltage in accordance with preferred embodiments of the present invention, with one rotation of the grip portion 11 of the cover 10, the cover 10 is suitably locked such that the bushing 14 and the locker 40 rotate at the same time and the bushing 14 is suitably inserted into the locking groove 35b by the elastic force of the first spring 13 to lock the locker 40. Accordingly, as a result, the locker 40 presses the interlock pin 55 through the interlock housing 54 to electrically connect the interlock pin 55 to the BMS 70, thus allowing the current to flow.

According to still other exemplary embodiments, when the grip portion 11 of the cover 10 is suitably rotated in the opposite direction, the cover 10 is unlocked such that the bushing 14 and the locker 40 rotate at the same time and the bushing 14 is suitably extracted from the locking groove 35b by the first spring 13 and inserted into the unlocking groove 35a to unlock the locker 40. Accordingly, as a result, the locker 40 suitably releases the interlock pin 55 through the interlock housing 54 to electrically disconnect the interlock pin 55 from the BMS 70, thus cutting off the current flow to prevent the occurrence of arc when the external connector 60 is disconnected from the female housing 50.

As described herein, the present invention provides, but is not limited to, the following advantages:

According to preferred embodiments of the invention as described herein, since the interlock housing moves up and down in the rotational direction of the locker to perform the interlock function, the interlock housing can suitably cut off the current flow in advance when the external connector is suitably disconnected while the electric power of the high voltage battery is applied, thus preventing the occurrence of arc;

According to further preferred embodiments as described herein, with one rotation of the cover, the rotational force is suitably transmitted to the locker through the projection to rotate the locker, and further the pressing portion of the locker and the interlock housing can be locked and unlocked by the second spring and the bushing; and Accordingly, in preferred embodiments of the present invention, the interlock pin can be suitably locked and unlocked by one rotation of the locker, thus improving the safety and workability.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A safety device for cutting off high voltage for a hybrid electric vehicle, the safety device comprising:
a male housing including a guide hole formed on the bottom thereof;
a female housing into which the male housing is inserted;
a cover including a projection formed on the bottom thereof to rotate along the guide hole;
a locker connected to the projection and rotating along the guide hole; and
an interlock housing including an interlock pin attached to the bottom thereof and moving up and down in the rotational direction of the locker to control the current flow between the interlock pin and a battery management system, thus preventing the occurrence of arc when an external connector is disconnected.

2. The safety device of claim 1, wherein the cover comprises a first spring inserted into the projection and a bushing movably supported in the vertical direction by the first spring and fixing the locker.

3. The safety device of claim 1, wherein the male housing comprises a guide projection formed along the guide hole on the bottom thereof to guide the rotational movement of the bushing inserted into the projection, an unlocking groove formed on one end of the guide hole such that the bushing is inserted and fixed thereto, and a locking groove formed on the other end of the guide hole such that the bushing is inserted and fixed thereto.

4. The safety device of claim 1, wherein the female housing comprises a projection formed on the bottom thereof, a second spring mounted in the inside of the projection, an interlock housing supported by the second spring and moving up and down by a pressing portion formed on the locker to be extracted from and inserted into the projection, and an interlock pin inserted and protruding through a through-hole of the projection by the interlock housing and electrically connected to and disconnected from the battery management system.

5. The safety device of claim 1, wherein the locker comprises a pressing portion having a wedge-shaped cross section to press the interlock housing during rotation.

6. A safety device for cutting off high voltage for a hybrid electric vehicle, the safety device comprising:
a male housing comprising a guide hole;
a female housing into which the male housing is inserted;
a cover comprising a projection;
a locker connected to the projection; and
an interlock housing,
wherein the interlock housing includes an interlock in attached to the bottom thereof and moves up and down in the rotational direction of the locker to control the current flow between the interlock in and a battery management system, thus preventing the occurrence of arc when an external connector is disconnected.

7. The safety device for cutting off high voltage for a hybrid electric vehicle of claim 6, wherein the male housing includes the guide hole formed on the bottom thereof.

8. The safety device for cutting off high voltage for a hybrid electric vehicle of claim 6, wherein the cover comprising the projection is formed on the bottom thereof to rotate along the guide hole.

9. The safety device for cutting off high voltage for a hybrid electric vehicle of claim 6, wherein the locker is connected to the projection and rotating along the guide hole.

* * * * *